United States Patent
Sollmann et al.

(10) Patent No.: US 10,414,134 B2
(45) Date of Patent: Sep. 17, 2019

(54) COEXTRUSION FILM AND METHOD OF MIXING

(71) Applicants: Henner Sollmann, Gronau (DE); Matthias Perick, Ahaus-Altstaette (DE); Marcel Grossmann, Essen (DE); Herbert Bader, Nordwalde (DE)

(72) Inventors: Henner Sollmann, Gronau (DE); Matthias Perick, Ahaus-Altstaette (DE); Marcel Grossmann, Essen (DE); Herbert Bader, Nordwalde (DE)

(73) Assignee: MONDI CONSUMER PACKAGING TECHNOLOGIES GMBH, Gronau (DE)

( * ) Notice: Subject to any disclaimer, the term of this patent is extended or adjusted under 35 U.S.C. 154(b) by 101 days.

(21) Appl. No.: 14/577,050

(22) Filed: Dec. 19, 2014

(65) Prior Publication Data

US 2015/0174871 A1 Jun. 25, 2015

(30) Foreign Application Priority Data

Dec. 23, 2013 (DE) .......................... 10 2013 114 783

(51) Int. Cl.
*B32B 27/08* (2006.01)
*B29C 48/21* (2019.01)
(Continued)

(52) U.S. Cl.
CPC .............. *B32B 27/08* (2013.01); *B29C 44/24* (2013.01); *B29C 48/0012* (2019.02); *B29C 48/08* (2019.02); *B29C 48/21* (2019.02); *B29C 48/92* (2019.02); *B29C 55/12* (2013.01); *B32B 5/18* (2013.01); *B32B 25/08* (2013.01); *B32B 27/20* (2013.01); *B32B 27/32* (2013.01); *B32B 27/40* (2013.01); *B29C 48/0018* (2019.02); *B29C 2948/92647* (2019.02); *B29K 2023/06* (2013.01); *B29K 2023/12* (2013.01);
(Continued)

(58) Field of Classification Search
CPC ........... B32B 27/08; B32B 27/20; B32B 5/18; B32B 25/08; B32B 27/32; B32B 27/40; B32B 2305/026; B32B 2250/03; B32B 2307/51; B32B 2307/514; B32B 2555/00; B32B 2307/72; B29C 55/12; B29C 47/065; B29C 44/24; B29C 47/0021; B29C 47/0042; B29C 47/92; B29C 2947/92647; B29C 47/0057; B29K 2105/16; B29K 2105/04; B29K 2105/0088; B29K 2105/0085; B29K 2025/08; B29K 2023/12; B29K 2023/06; B29L 2009/00; Y10T 428/24975
USPC ....................................... 428/216; 264/173.12
See application file for complete search history.

(56) References Cited

U.S. PATENT DOCUMENTS 5,691,034 A 11/1997 Krueger
7,449,240 B2 11/2008 Hamulski
(Continued)

*Primary Examiner* — Brian Handville
(74) *Attorney, Agent, or Firm* — Andrew Wilford

(57) ABSTRACT

A coextrusion film has a core layer made of thermoplastic elastomer, and first and second outer layers sandwiching the core layer. The outer layers are each formed from a polymer having a lower elasticity than the thermoplastic elastomer of the core, each have a layer thickness of less than 15 μm, each have a density of less than 0.800 g/cm³, and each have more than 500 gas-filled cells per 1 cubic millimeter of volume.

9 Claims, 1 Drawing Sheet

(51) Int. Cl.
  *B32B 5/18* (2006.01)
  *B32B 25/08* (2006.01)
  *B32B 27/32* (2006.01)
  *B32B 27/40* (2006.01)
  *B29C 44/24* (2006.01)
  *B29C 55/12* (2006.01)
  *B32B 27/20* (2006.01)
  *B29C 48/92* (2019.01)
  *B29C 48/08* (2019.01)
  *B29C 48/00* (2019.01)
  B29K 23/00 (2006.01)
  B29K 25/00 (2006.01)
  B29K 105/00 (2006.01)
  B29K 105/04 (2006.01)
  B29K 105/16 (2006.01)
  B29L 9/00 (2006.01)

(52) U.S. Cl.
  CPC .. *B29K 2025/08* (2013.01); *B29K 2105/0085* (2013.01); *B29K 2105/0088* (2013.01); *B29K 2105/04* (2013.01); *B29K 2105/16* (2013.01); *B29L 2009/00* (2013.01); *B32B 2250/03* (2013.01); *B32B 2305/026* (2013.01); *B32B 2307/51* (2013.01); *B32B 2307/514* (2013.01); *B32B 2307/72* (2013.01); *B32B 2555/00* (2013.01); *Y10T 428/24975* (2015.01)

(56) References Cited

U.S. PATENT DOCUMENTS

2006/0246272 A1\* 11/2006 Zhang ............... A61F 13/53708
  428/304.4
2012/0164383 A1   6/2012 Sollmann \* cited by examiner

COEXTRUSION FILM AND METHOD OF MIXING

FIELD OF THE INVENTION

The present invention relates to a coextrusion film. More particularly this invention concerns a method of making such a film.

BACKGROUND OF THE INVENTION

A standard coextrusion film has a core layer made of a thermoplastic elastomer first and second outer layers each formed from a polymer having a lower elasticity than the thermoplastic elastomer. The outer layers each have a layer thickness of less than 15 µm and empty or gas-filled cells formed by foaming.

Such a coextrusion film is particularly provided as an elastic material for disposable hygiene products and is used, for example, as an elastic waistband or as an elastic closure element in a diaper. Even though high demands are placed on the second stretching behavior and the elastic return force in such an application, the material must be as cost-effective as possible in view of the unit quantities of corresponding disposable products.

It must be kept in mind that multilayered laminates are frequently used for the abovementioned applications in which the coextrusion film us on one or even both sides over additional layers, particularly top layers of nonwoven.

A film with an elastic core layer and inelastic outer layers is known from U.S. Pat. No. 5,691,034. The outer layers are relatively stiff and are made, for example, of a polyolefin, particularly polyethylene or polypropylene, a polyethylene terephthalate or polyacrylate. The outer layers have a microtexture that has been produced by stretching the laminate beyond the elastic limit of the outer layers. The microtexture consists of small folds that are formed upon the elastic return of the film after second stretching, the alignment of the folds being dependent on the direction of second stretching. The film can be stretched uniaxially or also biaxially. The microtexture is perceived as a roughened, soft surface texture.

A coextrusion film is known from U.S. Pat. No. 7,449,240 that has a core layer made of a thermoplastic elastomer and outer layers made of a less elastic material. The outer layers consist of a thermoplastic plastic with a brittle consolidated molecular structure that stretches only a little when tensioned and breaks without transition when a predefined breaking limit is reached. The brittle, consolidated molecular structure is irreversibly broken open by a uniaxial second stretching transverse to the direction of extrusion that is referred to as an activation. As a result, the coextrusion film can be stretched elastically transverse to the direction of extrusion. The outer layers can be made of a polyolefin made brittle through post-treatment, a mixture of polyolefin and polystyrene or a mixture of polyolefin, polystyrene and ethylene vinyl acetate. In the direction of extrusion, which is also referred to as the machine direction, the brittle consolidated molecular structure remains intact and stiffens the material. The layered composite has no elasticity in the machine direction.

A coextrusion film with the features described above is known from US 2012/0164383. The coextrusion film has pores formed in the top layers through foaming and subsequent second stretching. By stretching the coextrusion film, which is also referred to as activation, the coextrusion film develops elastic characteristics and a textured top layer at the same time. The pores in the top layer improve the elastic characteristics of the coextrusion film that is reversibly stretchable to a great extent after its activation. The pores also result in a matte, irregular surface.

OBJECTS OF THE INVENTION

It is therefore an object of the present invention to provide an improved coextrusion film and method of making same. Another object is the provision of such an improved coextrusion film and method of making same that overcomes the above-given disadvantages, in particular that is characterized by an especially low second stretching force when stretched for the first time and good, uniform mechanical characteristics.

SUMMARY OF THE INVENTION

A coextrusion film has according to the invention a core layer made of thermoplastic elastomer, and first and second outer layers sandwiching the core layer. The outer layers are each formed from a polymer having a lower elasticity than the thermoplastic elastomer of the core, each have a layer thickness of less than 15 µm, each have a density of less than 0.800 g/cm$^3$, and each have more than 500 gas-filled cells per 1 cubic millimeter of volume.

According to the invention, an especially uniform structure with a great number of very small cells is provided. The invention is based on the discovery that the structure of the foamed outer layers is of special importance particularly for the first stretching of the coextrusion film. According to the invention, when measured prior to first stretching that is, activation, the outer layers are also foamed at least to the extent that the density is less than 0.800 g/cm$^3$, preferably less than 0.700 g/cm$^3$.

When starting from the usual polymer materials for the outer layers, such as polyolefin in particular, one therefore achieves a density reduction of at least 15%, preferably at least 25%.

At the same time, the cells are relatively small and distributed evenly in the outer layers. As a result, when subjected to tension, the material with the cells and intermediately arranged webs made of polymer material can be stretched to a certain extent similarly to a mesh solely as a result of its structure. For the first stretching, relatively little force is therefore required particularly at the start of stretching.

While the outer layers with their cells are stretched, as it were, right at the beginning of second stretching, the polymer of the outer layers is subsequently stretched plastically or even torn in areas. The plastic second stretching also offers the advantage that individual relatively thin strands of the polymer of the outer layers are stretched here as a result of the uniform distribution.

Finally, this also results in the advantage that, due to the especially small-celled, uniform structure of the cells, the tearing of the outer layers occurs over an especially wide second stretching area, so if a cell is torn open, a certain mobility is imparted there locally to the outer layers, whereby immediately adjacent cells are often torn only after a substantial delay. This also has the effect that, particularly at the beginning of a first stretching, a soft behavior of the material is achieved that is unknown in the prior art.

This results in several advantages to the invention with respect to the second stretching characteristics. First, the first stretching, referred to as activation, can also be performed more easily and in a more controlled manner. Depending on the specific application, it is also possible to completely eliminate first stretching. While a user would perceive substantially more resistance on first stretching, the coextrusion film alone or in a layered composite with nonwoven layers laminated on it is less stiff, so that the user will also recognize the unactivated coextrusion film as being stretchable and handle it accordingly.

Moreover, the feel of the outer layers is also further is improved with the invention. One obtains an especially soft, pleasant surface, giving good "hand" to the product. Depending on the specific application, it can therefore also be considered to omit the lamination with a nonwoven material at least on one side of the coextrusion film for cost-related reasons, such lamination usually being provided in order to provide a very soft structure with a textile feel that is gentle on the skin. In addition, the especially uniform structure also has the effect that the outer layers can be adhered with particular ease to additional layers during lamination.

The cells can be present both as closed cells, as an open-cell structure or in a mixed form.

In the case of an open-cell structure, adjacent cells merge in part with each other. A substantially convex, cell-shaped gap or pore is referred to as a cell.

According to a preferred embodiment of the invention, the outer layers have greater than 2500, especially preferably greater than 10,000 cells per 1 $mm^3$ of volume. When the coextrusion film is viewed from the top, the cells can also overlap in part.

In the framework of the invention, in order to enable the especially small and uniformly distributed cells to be produced, special methods are used for the manufacture of the outer layers of the coextrusion film. In doing so, what must be achieved is that, immediately after the molten plastic leaves the coextrusion nozzle, a great number of small cells is instantly produced and the coextrusion film also hardens before the small cells are able to join together. To achieve this, a manufacturing method can be provided in which a plastic melt of the thermoplastic elastomer for the core layer is prepared in a first extruder and the plastic melt of a thermoplastic base substance for at least one of the outer layers is prepared in a second extruder. A liquid and/or gaseous propellant is added to the thermoplastic base substance at a pressure between 35 and 75 bar and the propellant expands as a result of the drop in pressure after exiting a coextrusion nozzle and bringing about a homogeneous distribution of the cells in the corresponding outer layer.

As a result of the high pressure of the propellant, it is dispersed in the thermoplastic base substance and also dissolved in the polymer melt to a certain extent.

Carbon dioxide and nitrogen are particularly worthy of consideration as propellants, and the propellant is especially preferably introduced into the extruder vapor-liquid equilibrium as a supercritical fluid. Through the provision of the propellant in a supercritical state, it behaves in a substantially incompressible manner but dissolves relatively well in the polymer melt nonetheless. As a result of the pressure drop after exiting the nozzle outlet, the propellant expands instantly and forms an especially homogeneous and fine distribution of the cells.

In order for the formation to support as many small cells as possible, a filler can be added to the thermoplastic base substance in the form of particles as a nucleating agent. The nucleating agent is preferably inorganic solid particles such as talc in powder form. The individual particles distributed uniformly in the thermoplastic base substance facilitate the formation of a cell locally after emergence from the nozzle gap.

According to the invention, both outer layers have small, uniformly distributed cells. Starting from the previously described method, the thermoplastic base substance from the second extruder can thus be divided upstream of the coextrusion nozzle in order to form both outer layers. Alternatively, a third extruder can also be provided, in which case the two outer layers are then formed from separately fed thermoplastic base substances. With this embodiment, it is also possible to use different materials for the two outer layers.

In contrast to the approach of reducing manufacturing costs to the greatest possible extent, a relatively elaborate and thus cost-intensive method is used in relation to the invention for the manufacture of the coextrusion film. However, the invention is based on the discovery in this context that it is precisely through a specially selected, especially fine distribution and structure of the cells in the outer layers that a substantial, unexpected improvement of the mechanical characteristics can be achieved.

The layer thickness of the outer layers is preferably between 0.5 and 10 μm, and the core layer has a thickness between 15 and 150 μm, for example.

In principle, additional intermediate layers can also be arranged according to the invention between the two outer layers and the core layer. Preferably, however, the present invention relates to a three-layered coextrusion film that consists exclusively of the two outer layers and the core layer. Accordingly, the thickness of the overall extrusion film is typically between about 20 and 180 μm.

The outer layers preferably have polyolefin as the thermoplastic base substance. A mixture of polyethylene and polypropylene having tough stretchability is especially preferred.

Styrene block copolymers, thermoplastic polyurethane and polyolefinic block copolymers with elastic characteristics are particularly worthy of consideration as thermoplastic elastomers. The styrene block copolymers particularly include styrene-isoprene-styrene block copolymers (SIS),
styrene-butadiene-styrene copolymers (SBS),
styrene-ethene-butene-styrene copolymers (SEBS),
styrene-isoprene-butadiene copolymers (SIBS) and
styrene-ethene-propene-styrene copolymers (SEPS) that can also be used in mixture.

The especially advantageous characteristics of the coextrusion film have a direct impact on second stretching and particularly on first stretching (activation). Starting from a unstretched state after manufacture, the coextrusion film can initially be stretched in the production direction and/or transverse direction by at least 100%, especially preferably at least 200%.

The second stretching characteristics can be tested, for example, by stretching the coextrusion film during a first stretching by 150%, thereby activating it. The irreversible portion of the second stretching, namely the permanent change in length between the unstretched film and the film that has been stretched once, is preferably less than 20%, especially preferably less than 10%.

The coextrusion film is characterized according to the invention precisely in that little force is required for the first stretching. As will readily be understood, the second stretching forces during first stretching are greater than during subsequent second stretchings. According to a preferred embodiment of the invention, however, provision is made that the ratio of the second stretching work up to a second stretching of 100%—determined in the production direction and/or in the transverse direction—exerted during a first stretching (activation) by 150% and during a subsequent second stretching is less than 2:1.

The especially easy stretchability is reflected not only in the second stretching work that is the integral of the second stretching force over the path, but also in the second stretching force itself. Accordingly, the coextrusion film according to the invention also meets the requirement that the ratio of the second stretching force—determined at a second stretching of 100%—exerted during a first stretching (activation) by 150% and during a subsequent second stretching is less than 3:2.

The coextrusion film manufactured according to the invention can readily be rolled up. Although the materials of the core layer generally have a high level of stickiness and thus tend to stick together, the coextrusion film according to the invention can be pulled off of a roll and processed even after an extended period of storage. The foamed outer layers act as spacers both in the activated and unactivated state, an additional surface enlargement being achieved by the activation.

The processing temperatures of the materials described for the core layer and the outer layers are typically between 150° C. and 230° C.

According to one example, a three-layered coextrusion film was formed with a total thickness of 56 µm by cast film extrusion. In a symmetrical construction, the two outer layers is have a layer thickness of 8 µm, and the increase in volume compared to a unfoamed, compact layer is 33%. The outer layers are formed from a mixture of polyethylene and polypropylene and contain talcum as a nucleating agent. In contrast, the core layer is formed from a styrene block copolymer with a layer thickness of 40 µm. The coextrusion with the foaming of the outer layers was done according to the "MuCell method" developed by Trexel Inc. The coextrusion film is characterized by especially low first stretching forces and good mechanical characteristics. The surface of the coextrusion film has a uniform and soft feel.

BRIEF DESCRIPTION OF THE DRAWING

The above and other objects, features, and advantages will become more readily apparent from the following description, reference being made to the accompanying drawing in which.

SPECIFIC DESCRIPTION OF THE INVENTION

Figure 1:
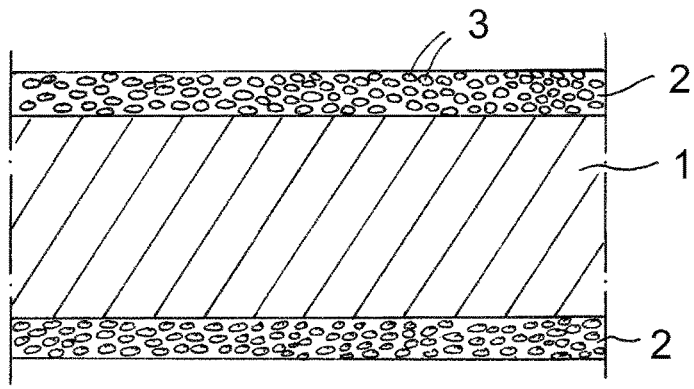
FIG. 1 is a large-scale section through a coextrusion film according to the invention.

As seen in FIG. 1, a coextrusion film has a core layer 1 of a thermoplastic elastomer sandwiched between outer layers 2 each formed from a polymer having a lower elasticity than the thermoplastic elastomer of the core layer 1. In the embodiment shown, the ratio of the layer thickness of one of the outer layers 2 to the thickness of the core layer is between 1:3 and 1:10, particularly 1:5. In a symmetrically layered laminate, the outer layers 2 can have a thickness of 8 µm, for example, whereas the core layer 1 is 40 µm thick.

Moreover, FIG. 1 shows both outer layers 2 have cells 3 formed through foaming.

According to the invention, the outer layers, which are preferably formed from polyolefin, particularly a mixture of PE and PP, are foamed until the density is less than 0.800 g/cm$^3$, particularly less than 0.700 g/cm$^3$. Furthermore, the cells 3 are small and distributed uniformly in the outer layers 2. Consequently, the outer layer 2 has greater than 500 cells, preferably greater than 1000 cells, and especially preferably greater than 5000 cells 3 per 1 mm$^3$ of volume.

Figure 3:
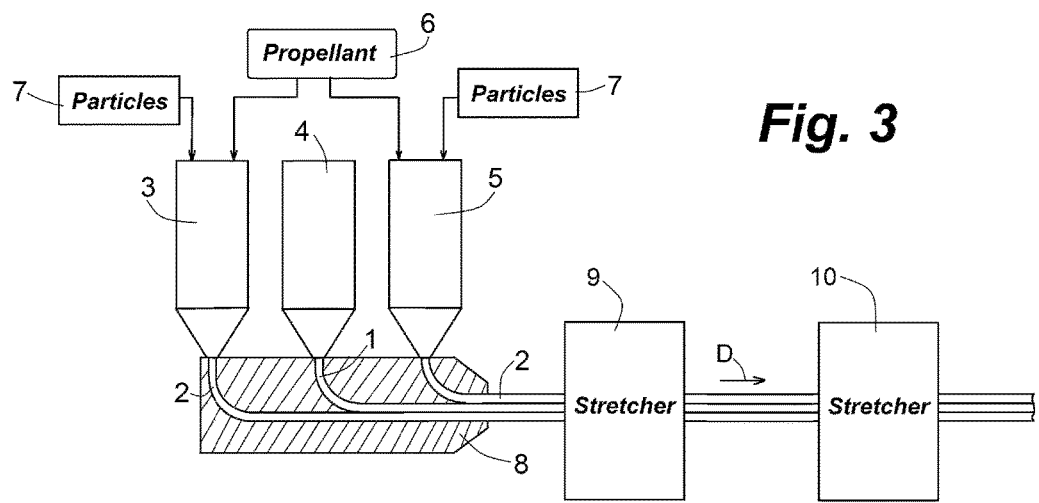
FIG. 3 is a block diagram illustrating the method of this invention.

As shown in FIG. 3, this is done by emitting first, second and third melts forming the layers 1 and 2 from respective extruders 3, 4, and 5. The extruders 3 and 5 of the outer layers are supplied a propellant under significant superatmospheric pressure from a supply 6 and nucleating particles from supplies 7. The layers 1 and 2 are combined in a coextrusion nozzle shown schematically at 8, and then passes through two stretchers 9 and 10.

The nucleating particles from the supplies 7 facilitate the formation of the especially small and uniformly distributed cells 3 in the melts of thermoplastic base substance of the outer layers 2 emitted by the extruders 3 and 5. Talcum is is particularly worthy of consideration as a nucleating agent.

The core layer 1 consists of a styrene block copolymer as a thermoplastic elastomer.

Through the fine distribution of the cells 3, the entire outer layers 2, which are here only 8 µm thick can be stretched with particular ease. Upon first stretching in the stretcher 9, which can be formed of rolls having interengaging teeth between which the layers 1 and 2 pass, the outer layers 2 can first be stretched to a certain extent until the polymeric material between the cells 3 is plastically deformed and individual areas can finally tear open. Particularly such a tearing open occurs during a first stretching over a relatively large path area.

Figure 2:
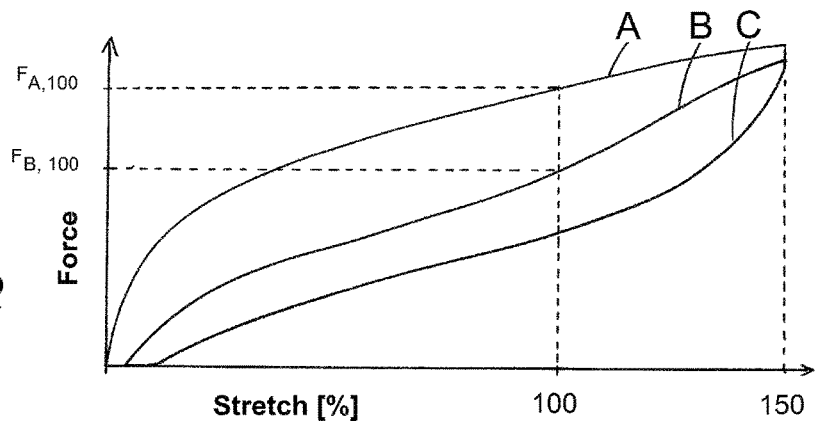
FIG. 2 is a stretch diagram illustrating the second stretching of the coextrusion film in the production direction (machine direction)

Taking this as the point of departure, FIG. 2 shows an example of a force-second stretching diagram. The second stretching force is plotted as a function of the second stretching of the coextrusion film in percent. Curve A shows the second stretching force profile during a first stretching of the coextrusion film after its production, this first stretching also being referred to as activation. During the first stretching, the coextrusion film is stretched starting from its original length by 150%, with curve C showing the second stretching force profile of the coextrusion film upon its return or rebound.

Taking this as a point of departure, curve B shows the second stretching force profile for a second stretching after activation in the stretcher 10.

A greater force is required for a first stretching (curve A) than for a subsequent second stretching (curve B). However, the difference in the coextrusion film according to the invention is relatively small compared to known designs. Accordingly, it can be seen from the profile of curve A that relatively easy deformation is possible right at the beginning of second stretching. Whereas a very steep, linear second stretching force profile is observed in the coextrusion film known from the prior art, the coextrusion film according to the invention can be activated with relative ease. More particularly, the ratio of the second stretching work up to a second stretching of 100%—determined in the production direction D (FIG. 3) and/or in transversely thereto and parallel to the plane of the film—to be applied during a first stretching (curve A) by 150% and during a subsequent second stretching is smaller than 2:1. FIG. 2 shows for comparison the areas below the curves A and B that are included up to a value of 100%.

Furthermore, it can be seen that the ratio of the second stretching force for a second stretching in the plane of the workpiece of 100%—determined in and/or transverse to the production direction D—exerted during a first stretching by 150% and a subsequent second stretching is smaller than 3:2. The corresponding relative values can be read from FIG. 2 as $F_{A,100}$ and $F_{B,100}$.

We claim:

1. A coextrusion film comprising:
a core layer made of thermoplastic elastomer; and
first and second outer layers sandwiching the core layer, each formed from a polymer having a lower elasticity than the thermoplastic elastomer of the core, each having a layer thickness of less than 15 μm, each having a density of less than 0.800 g/cm³, and each having more than 10,000 gas-filled cells per 1 cubic millimeter of volume such that seen in top view the cells of each outer layer overlap in part.

2. The coextrusion film defined in claim 1, wherein the outer layers each have a density of less than 0.7 g/cm³.

3. The coextrusion film defined in claim 1, wherein the outer layers each have a thickness between 0.5 and 10 μm.

4. The coextrusion film defined in claim 1, wherein the core layer has a thickness between 15 and 150 μm.

5. The coextrusion film defined in claim 1, wherein the thermoplastic elastomer of the core layer is a styrene block copolymer, a thermoplastic polyurethane, or a polyolefinic block copolymer.

6. The coextrusion film defined in claim 1, wherein the outer layers are each of a polyolefin.

7. The coextrusion film defined in claim 6, wherein the polyolefin is a mixture of polyethylene and polypropylene.

8. The coextrusion film defined in claim 1, wherein the outer layers each contain a filler of particles as a nucleating agent.

9. A coextrusion film comprising:
a core layer made in a first extruder of a thermoplastic elastomer; and
first and second outer layers formed from a polymer having a lower elasticity than the thermoplastic elastomer of the core layer by adding a liquid or gaseous propellant to a thermoplastic base substance in respective second extruders at a propellant pressure between 35 and 75 bar, the first and second layers and core layer being coextruded in a nozzle while maintaining the propellent at the propellant pressure such that when the first and second layers issue from the nozzle into ambient pressure the first and second layers each have a layer thickness of less than 15 μm, a density of less than 0.800 g/cm³, and more than 10,000 gas-filled cells per 1 cubic millimeter of volume in a homogenous distribution such that seen in top view the cells of each outer layer overlap in part.

* * * * *